(12) United States Patent
Khan et al.

(10) Patent No.: US 11,175,141 B2
(45) Date of Patent: Nov. 16, 2021

(54) CHECKING MAP ALIGNMENT

(71) Applicant: HERE GLOBAL B.V., Eindhoven (NL)

(72) Inventors: Muhammad Irshan Khan, Tampere (FI); Jari Syrjärinne, Tampere (FI); Lauri Wirola, Tampere (FI); Pavel Ivanov, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 214 days.

(21) Appl. No.: 15/737,869

(22) PCT Filed: Jun. 23, 2015

(86) PCT No.: PCT/EP2015/064033
§ 371 (c)(1),
(2) Date: Dec. 19, 2017

(87) PCT Pub. No.: WO2016/206717
PCT Pub. Date: Dec. 29, 2016

(65) Prior Publication Data
US 2019/0011262 A1    Jan. 10, 2019

(51) Int. Cl.
| | |
|---|---|
| G01C 21/00 | (2006.01) |
| G01C 21/20 | (2006.01) |
| G06F 16/29 | (2019.01) |
| G09B 29/00 | (2006.01) |
| G09B 29/10 | (2006.01) |

(52) U.S. Cl.
CPC ......... *G01C 21/005* (2013.01); *G01C 21/206* (2013.01); *G06F 16/29* (2019.01); *G09B 29/00* (2013.01); *G09B 29/106* (2013.01)

(58) Field of Classification Search
CPC combination set(s) only.
See application file for complete search history.

(56) References Cited

U.S. PATENT DOCUMENTS

| | | |
|---|---|---|
| 7,693,654 B1 | 4/2010 | Dietsch et al. |
| 2010/0171757 A1 | 7/2010 | Melamed |
| 2010/0225665 A1 | 9/2010 | Ofek et al. |
| 2012/0143495 A1 | 6/2012 | Dantu |

(Continued)

FOREIGN PATENT DOCUMENTS

| | | |
|---|---|---|
| GB | 2376861 A | 12/2002 |

OTHER PUBLICATIONS

Bosse, Michael et al. "Simultaneous Localization and Map Building in Large-Scale Cyclic Environments Using the Atlas Framework." International Journal of Robotics Research, vol. 23, Issue 12, Dec. 2004, pp. 1113-1139.

(Continued)

*Primary Examiner* — Abby Y Lin
*Assistant Examiner* — Renee LaRose
(74) *Attorney, Agent, or Firm* — Alston & Bird LLP

(57) ABSTRACT

A method, performed by an apparatus (2)(4), is disclosed, the method comprising: obtaining alignment information pertaining to a map (10), which is or is to be aligned in a reference frame; performing or receiving a result of a check of the alignment of the map (10) at least based on the obtained alignment information and on reference information allowing for an at least partial check of the alignment of the map (10) in the reference frame.

21 Claims, 7 Drawing Sheets

(56) References Cited

U.S. PATENT DOCUMENTS

| | | | | |
|---|---|---|---|---|
| 2013/0138342 A1* | 5/2013 | Zaid | ................ | G01C 21/206 |
| | | | | 701/526 |
| 2013/0162481 A1* | 6/2013 | Parvizi | ............... | G01S 5/0205 |
| | | | | 342/452 |
| 2013/0226451 A1* | 8/2013 | O'Neill | .............. | H04W 4/029 |
| | | | | 701/450 |
| 2014/0132640 A1* | 5/2014 | Sharma | ............. | G09B 29/005 |
| | | | | 345/661 |
| 2014/0281698 A1 | 9/2014 | Khorashadi et al. | | |
| 2014/0285631 A1 | 9/2014 | Janky et al. | | |
| 2015/0019121 A1 | 1/2015 | Gao et al. | | |
| 2016/0161592 A1 | 6/2016 | Wirola et al. | | |

OTHER PUBLICATIONS

International Search Report and Written Opinion of International Searching Authority for U.S. Patent Application No. PCT/EP2015/064033 dated Mar. 24, 2016, 13 pages.

International Preliminary Report on Patentability (Chapter I) for International Patent Application No. PCT/EP2015/064033 dated Jan. 4, 2018, 10 pages.

\* cited by examiner

CHECKING MAP ALIGNMENT

FIELD OF THE DISCLOSURE

The invention relates to the field of the alignment of maps, in particular used during the data collection stage for positioning purposes, such as indoor positioning.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors. As a result, the required positioning accuracy (of e.g. 2 to 3 m), a coverage (of e.g. nearly 100%) and floor detection are challenging to achieve with satisfactory performance levels with such systems and signals that were not designed and specified for the indoor use cases in the first place.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions. What is typical to these solutions is that they require either deployment of totally new infrastructure (beacons, tags and so on) or manual exhaustive radiosurveying of the buildings including all the floors, spaces and rooms. This is rather expensive and will take a considerable amount of time to build the coverage to the commercially expected level, which in some cases narrowed the potential market segment only to very thin customer base e.g. for health care or dedicated enterprise solutions.

As an example, a WLAN based (or any other radio transmitter based) positioning solution may be divided in two stages, a training stage and a positioning stage.

In the training stage, learning data is collected. The data may be collected in the form of fingerprints that are based on measurements by mobile devices. A fingerprint may contain a location estimate and measurements taken from the radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. Alternatively or in addition, mobile devices may be used for collecting fingerprints in a systematic manner collected fingerprint data may be uploaded to a database in a server or in the cloud, where algorithms may be run to generate radio models of WLAN access points and/or radio maps for positioning purposes.

In the positioning stage, a mobile device may estimate its current location based on own measurements taken from the radio interface and on the data or a subset of data that is available from the training stage. Model data or radio map data that has been generated in the training stage may be transferred to mobile devices by a server via the Internet as assistance data for use in position determinations. Alternatively, model data and/or radio map data may be stored in a positioning server to which the mobile devices may connect to via the Internet for obtaining a position estimate.

A similar approach could be used for a positioning that is based on other types of terrestrial transmitters or on a combination of different types of terrestrial transmitters. The diversity of these technologies may make it difficult though to build a globally scalable indoor positioning solution, as the integration and testing will become complex if a large number of technologies is needed to be supported in the consumer devices, such as smartphones. Additionally, there are technical challenges related to the harvesting, processing, redundancy, ambiguity and storing the crowd-sourced data which may impede the creation of radio maps.

As a basis for surveying buildings to enable indoor positioning maps (e.g. of a floor) may be used. As the fingerprints are stored with respect to the maps, the usage of maps for surveying may then require a transformation of the map coordinates to global coordinates. This transformation of coordinates may be achieved by an alignment of the map. Generally, the transformation is usually done by one of the two methods. The first method uses manually entered reference points (e.g. 2 or more reference points) to calculate transformation and apply this transformation in order to align the map. The second method superimposes maps to some reference map (satellite imagery, 2D maps etc.) for the map to be alignment with respect to the reference map.

However, the methods for transforming map coordinates to e.g. global coordinates are prone to errors leading to undesirable results. The errors may be introduced in the first approach e.g. if a user has entered one or more wrong digits while inputting coordinates of a reference location. In the second approach a user may make an error in selecting proper scaling and/or rotation of a map for alignment. This could happen as satellite imagery and building boundaries shown in the two dimensional map do not have enough details for superimposing the maps correctly.

Data collected with such misaligned maps produce errors in the later positioning step. For example, the map alignment errors may produce coordinates which do not comply with any standard coordinate system. Thus, a correction of such errors may require a lot of effort. In the worst case all the data collected with the wrong alignment has to be discarded which wastes a lot of time, as a surveyor has to repeat the collection again with correctly aligned maps.

SUMMARY OF SOME EMBODIMENTS OF THE INVENTION

Different aspects and embodiments of the invention may have the effect of reducing afore mentioned problems such as a data collection with a misaligned map and may even prevent such problems from occurring in the first place. Different aspects and embodiments of the invention may thus help in collecting data with a good reliability.

In a first exemplary aspect, embodiments of the invention provide a method, performed by an apparatus. The method comprises obtaining alignment information pertaining to a map, which is or is to be aligned in a reference frame; and performing or receiving a result of a check of the alignment of the map at least based on the obtained alignment information and on reference information allowing for an at least partial check of the alignment of the map in the reference frame.

The method may in particular be a method for checking or for receiving a check of an alignment of a map in a reference frame.

By obtaining alignment information pertaining to the map, it is possible to either perform a check or to at least receive a result of a check of the alignment of the map, as the check can (at least) be based on the obtained alignment information and the reference information allowing for an at least partial check of the alignment of the map in the reference frame.

As an example, the map has still to be (at least partially) aligned or is about to be (at least partially) aligned with respect to the reference frame. In such a case, the check or its result may help to prevent a misalignment of a map with respect to the reference frame, when performing the alignment of the map. In other cases, the maps is already (at least partially) aligned with respect to the reference frame. In such a case, the check or the result of the check may help to identify an already misaligned map with respect to the reference frame and/or may prevent any (further) data collection with regard to the misaligned map.

As an example, a map may be understood to be a (digital) medium or representation for presenting a part of an area, region or space, such as (a part of) a surface of the earth or of different floors of a buildings, for instance. A map may also be (a set of) data, such as a file or a part thereof, representing or allowing for the generation of such a (digital) medium or representation. The map may be a spatial map, a position map, a navigational map, topographic and/or a geographic map to name some examples. The map may be or represent a levelled, (down) scaled and/or generalized plan view or top view of a certain area, region or space. The map may, for example, be a two-dimensional or three-dimensional map.

An alignment of a map may be understood to be the relation or the process of defining the relation of the map with respect to a reference frame. The alignment of a map may thus be understood as an arrangement, position and/or orientation of the map with respect to a reference frame. A partially aligned map may only be aligned with respect to certain type of alignment in the reference frame (e.g. scale, orientation, position of the map). Such a type may be seen as a degree of freedom for aligning a map in a reference frame. An example of a partially aligned map may be a map which is aligned with regard to its scale, but not with regard to its position with respect to the reference system.

The alignment information may for example be stored in association with the map. For instance, the alignment information may be embedded in the map (e.g. in a data file). In another example the alignment information may be stored separate from but associated to the map (e.g. in a separate data file).

A reference frame may in particular be understood to be or comprise a (spatial) coordinate system and a (physical) reference point to (uniquely) fix the coordinate system in space. The reference frame may in particular be a reference frame for globally and uniquely defining a position in three-dimensional space. Thus, the reference frame may allow for multiple maps to be aligned within a common reference frame.

The alignment information may in one example be information (e.g. data), on the basis of which an (at least partial) alignment of the map can be performed. Thus, in case the map is not yet (completely) aligned with respect to the reference frame, the alignment information may be information which may allow for an (at least partial) alignment of the map with respect to the reference frame. As another example, in case the maps is already (at least partially) aligned, the alignment information may also be information, which can be obtained because of the already performed alignment of the map.

The reference information allows for an at least partial check of the alignment of the map in the reference frame. Thus, the reference information may, as an example, pertain to the same type as the alignment information. For example, both the reference information and the alignment information may pertain to the same type (e.g. to a scale of the map) with respect to the alignment in the reference system. This may allow for a convenient check of the alignment of the map with respect to the reference system, e.g. by comparing the alignment information and the reference information.

The check of the alignment of the map, which is at least based on the obtained alignment information and the reference information, may in particular be a check of the validity, sanity and/or plausibility of the alignment of the map with respect to the reference frame. The check may have a positive or negative result, for instance. In one example, the check of the alignment is performed by the apparatus. As an example, the check may be performed by the apparatus based on a comparison of the obtained alignment information and the reference information. In another example, the check is performed outside the apparatus. In this case, the result of the check is received by the apparatus. As an example, the check may be performed by another apparatus or by a user of the apparatus, who then provides the result of the check to the apparatus, which receives the result of the check.

That the method is performed by an apparatus is understood to mean that the method may also be performed by more than one apparatus, i.e. the method may be performed by at least one apparatus. However, the method may also be performed by a single apparatus (e.g. a single device). The apparatus may for example be a mobile device and/or a server, as will also be described with respect to the further aspects of the invention. For instance, the methods according to the embodiments of the invention may be carried out by one or more data-processing apparatuses or a part thereof, such as a chip or an integrated circuit. Examples of a data-processing apparatus are a computer, a personal computer, a portable computer, a thin client, a personal digital assistant, a mobile terminal, a mobile phone and/or any other electronic device which has at least one processor. In a preferred example, the data processing apparatus is a mobile phone, in particular a mobile smart phone.

The apparatus may in particular comprise display means or a display for visually providing the map to a user of the apparatus. The apparatus may in particular comprise input means or an input device for inputting alignment information and/or the reference information or a part thereof.

In another example, the method according to embodiments of the invention may be carried out by one or more servers or a part thereof. The method can also be carried out by the server(s) and by at least one client device connected to the server(s) or the respective parts thereof. A server is to be understood to mean, in particular, a data-processing unit in a network which communicates via the network with one or more data-processing units, the clients, in order to provide them with special services and/or computing power. In a client-server architecture of this type, the special services provided by the server and/or the computing power can be used by a plurality of clients so that the clients themselves, for example, have to retain less own computing power or, as another example, do not need to be provided with a larger database. A server and a client can designate both a data-processing apparatus and a program which is executed on the data-processing apparatus. The network is, for example, a local area network, a wide area network, a virtual network, a radio network, a telephony network and/or the Internet. The communication is effected, for example, in a wireless or wired-bound manner.

The alignment information may for instance be obtained from a memory of one of the apparatus. As an example, the alignment information may for example be requested by a program running on one of the apparatus. The alignment information may also be input by a user and obtained via input means of the apparatus, for example. However, the alignment information may also be obtained from another apparatus, for example. For instance, the alignment information may be obtained at a server from a client device, such as a mobile phone.

According to an exemplary embodiment of the method according to the first aspect the method further comprises: obtaining the reference information allowing for an at least partial check of the alignment of the map in the reference frame. Obtaining of the reference information allows for a check of the alignment of the map by the apparatus itself, which may increase the reliability of the check as the user does not need to perform the check.

For instance, the reference information may be obtained from a memory of one of the apparatus. As an example, the reference information may for example be requested by a program running on one of the apparatus. The reference information may also be input by a user and obtained via input means of the apparatus, for example. However, the reference information may also be obtained from another apparatus, for example. For instance, the reference information may be obtained at a server from a client device, such as a mobile phone.

According to an exemplary embodiment of the method according to the first aspect, the check of the alignment of the map at least pertains to at least one of: a scaling of the map with respect to the reference frame; an orientation of the map with respect to the reference frame; and a position of the map with respect to the reference frame.

A scaling of the map with respect to the reference frame may for example be the ratio of an applicable unit of distance on the map to the corresponding distance on the ground. As an example, the scaling of a map may be or comprise a scaling factor, e.g. a uniform scaling factor, which is identical in all directions, for example in two directions, in particular if the map is a two dimensional map. The particular scaling may depend on the type of map and how the map is provided. For instance, if the map is a digital image, a scaling may for example provide the information, that a certain amount of pixels of the digital image represent a certain distance on the ground. The scaling may for instance be represented by, indicated by and/or stored as one or more numbers. A scaling of the map with respect to the reference frame may be seen as a particular type of the alignment of the map with respect to the reference frame.

An orientation of the map with respect to the reference frame may be the result of a specific rotation of the map in the reference frame. An orientation may be a heading of the map. The map may be oriented or headed in a certain direction with respect to the reference frame. As an example, the orientation of the map may be the relationship between directions on the map and the corresponding compass directions in reality. For instance, the orientation may be an orientation in two dimensions, e.g. in case the map is a two dimensional map, or in three dimensions, e.g. in case the map is a three dimensional map. The orientation of the map may be represented by, indicated by and/or stored as a one or more numbers, e.g. by a degree value. An orientation of the map with respect to the reference frame may thus be seen as a particular type of the alignment of the map with respect to the reference frame.

A position of the map with respect to the reference frame may be understood as the spatial location of the map with respect to or within the reference frame. For instance, the position of the map with respect to the reference frame may be defined by associating a reference position of the map with a reference position in the reference frame. For instance, the position may be represented by, indicated by and/or stored as coordinates, e.g. one or more (e.g. three) numbers. A position of the map with respect two the reference frame may thus be seen as a particular type of the alignment of the map with respect to the reference frame.

The check of the alignment of the map may also pertain to multiple types of alignment of the map. For instance, the check of the alignment of the map may pertain to a scaling, an orientation and a position of the map with respect to the reference frame.

According to an exemplary embodiment of the method according to the first aspect, at least one of the alignment information and the reference information pertains to at least one of: a scaling of the map with respect to the reference frame; an orientation of the map with respect to the reference frame; and a position of the map with respect to the reference frame.

For instance, both the alignment information and the reference information pertain to the same type of the alignment of the map with respect to the reference frame. This may have the effect that a check of the alignment of the map is facilitated. However, it may also be possible that the information may pertain to different types of alignment of the map with respect of the reference frame. It may nevertheless be possible to check the alignment of the map with respect to the reference frame, e.g. if information on one type of the alignment of the map may be derived from information on another type of alignment of the map.

As an example, the alignment information of a map already aligned with respect to its scale may be obtained from a part of a memory associated with the map or extracted from embedded information in a file, which may also comprise the map; this may for instance be a present scaling factor of the already aligned map with respect to the reference frame. The reference information, as an example, may be input by the user via input means of an apparatus. The user may directly input a scaling factor, which he thinks is correct. However, the user may also input information, from which the scaling factor may be derived or derivable. In this case both the alignment information and the reference information pertain to the scaling of the map with respect to the reference frame. By comparing the present scaling factor of the alignment information with the input scaling factor of the reference information a check of the alignment of the map can be performed.

The alignment information and/or the reference information may also pertain to multiple types of alignment of the map with respect to the reference frame (e.g. to a scaling, an orientation and a position of the map with respect to the reference frame; an orientation).

According to an exemplary embodiment of the method according to the first aspect, the map is at least one of at least partially aligned and at least partially unaligned with respect the reference frame.

For a map at least partially unaligned with respect to the reference frame, it may be desirable to (further) align the map with respect to the reference frame with regard to certain types of alignments (e.g. scaling, orientation, position) with respect to the reference frame. For the (further) alignment it may be desirable, e.g. to check the (to be performed) alignment of the map with respect to the reference frame or receive a result of such a check. The check can for example be done by validating the alignment information, before using it for an alignment of the map with respect to the reference frame. This may prevent an unintentional misalignment.

For a map at least partially aligned with respect to the reference frame, it may desirable to check the already performed alignments (e.g. scaling, orientation, position) of the map with respect to the reference frame. For this, the (already performed) alignment of the map with respect to the reference frame may be checked, e.g. by comparing the alignment information and the reference information. This may help identifying a map, which is misaligned.

According to an exemplary embodiment of the method according to the first aspect, at least one of the alignment information and the reference information is representative of at least one of: at least one length; at least one direction; at least one position; and at least one vertical position.

Information representative of a length may for instance allow for a check of the alignment of the map pertaining to a scaling of the map with respect to the reference frame. As an example, the information representative of a length may indicate or be a value of length in a suitable unit (e.g. in units of the metric system, such as millimeters, centimeters, meters, or kilometers). As an example, a user may indicate a length on the map provided to the user (e.g. by an apparatus), which corresponds to a certain length in reality. The information may be obtained by an apparatus as alignment information or reference information representative of a length.

Preferably, the information is representative of at least two lengths (e.g. a first length and a second length), wherein at least two lengths are not measured along parallel lines. For instance, the information is representative of a first length and a second length, which are measured along lines which are substantially perpendicular to each other. This allows for obtaining information pertaining to a scaling in more than one direction. For instance, in case of a two dimensional map, this may allow for obtaining information pertaining to a scaling in each of the two dimensions of the map.

Information representative of a direction may for instance allow for a check of the alignment of the map pertaining to an orientation of the map with respect to the reference frame. A direction may be understood as the information contained in the relative position of one point with respect to another point (in particular without the distance information). The direction may be a relative or absolute direction. As an example, a sensor (e.g. a magnetometer of an apparatus) may measure a direction in the reference frame (e.g. a geographic direction, e.g. "North"). Thus information representative of a direction may be obtained. This may be an example of reference information. As another example, a user of an apparatus may mark a first and a second position on the map provided to him (e.g. by the apparatus). If the map is already aligned with respect to its orientation in the reference frame, alignment information representative of a direction (from the first point to the second point) according to the alignment of the map may be obtained. This may be an example of alignment information.

Information representative of a position may for instance allow for a check of the position of the map with respect to the reference frame. The information representative of a position may be a relative or absolute position, e.g. of an apparatus or the user. As an example, information representative of a position may be obtained from a user (e.g. by an apparatus) by marking his position on the map provided to him (e.g. by the apparatus). If the map is already aligned, the marked position relative to the map coordinates may be transformed into a (absolute) position with respect to the reference frame. Information representative of a position of an apparatus or its user may in another example be obtained by sensors, e.g. motion sensors, of an apparatus. The information representative of a position may for example be a radio signal based position estimate.

Information representative of a vertical position may for instance allow for a check of the vertical position of the map with respect to the reference frame. The vertical position may for instance be a height (e.g. above ground), an altitude (e.g. above sea level) or a floor level. The information may for example be input by a user, e.g. as an integer for the floor level. The information representative of a vertical position may also be an ambient pressure, which may be representative for the vertical position of an apparatus measuring the ambient pressure, e.g. with a barometer.

According to an exemplary embodiment of the method according to the first aspect, the alignment information is based on at least one of: a user input; and the alignment of the map.

A user may for instance input information via a touchscreen, a keyboard, a microphone or other suitable input means. For instance, the user may input alignment information directly, e.g. coordinates or a floor level, or the user may input information on the basis of which the alignment information can be determined. For instance, the user may input information on the map, which is (visually) provided to the user by an apparatus (e.g. a mobile device). As already described, the user may for instance, mark positions on the map. As an example, in case the map is already aligned with regard to a position of the map in the reference frame, alignment information pertaining to a position of the map with respect to the reference frame can then be obtained from the user input. Thus, the alignment information may also be based on the alignment of the map.

According to an exemplary embodiment of the method according to the first aspect, the reference information is based on at least one of: a user input; an output of one or more sensors of a mobile device; the alignment of at least one map; a radio signal based position estimate; and a predefined threshold.

As already described with respect to the alignment information, the user may input the reference information via a touchscreen, a keyboard, a microphone or other suitable input means. For instance, the user may input reference information directly, e.g. coordinates or a floor level, or the user may input information on the basis of which the reference information can be determined. For instance, the user may input information on the map, which is (visually) provided to the user by an apparatus (e.g. a mobile device). As already described, the user may for instance, mark positions on the map.

In another example the reference information may be based on an output of one or more sensors of a mobile device (which may be the apparatus performing exemplary embodiments of the method according to the first aspect). The sensors may be motion sensors, for example. Non-limiting examples of sensors are an accelerometer, a gyroscope, a magnetometer and a barometer. Such sensors may in particular provide reference information pertaining to a position of the map with respect to the reference frame.

In another example, the reference information may be based on the alignment of at least one map. The map may be the map, the alignment of which is checked, or another map. For instance, it may be assumed that another map is aligned similar to the map, the alignment of which is checked, with respect to the reference frame. For instance, it may be assumed, that the other map is positioned similar with respect to the reference frame. As an example, it may be assumed, that the map, the alignment of which is checked, and the other map have apart from the vertical position substantially the same position, e.g. because they are maps of different floors of the same building, which generally have different vertical positions but the same horizontal positions. Then, reference information pertaining to the position of the map may be based on the alignment of the other map. As an example, it is possible that only one map representing one floor of a building was misaligned and the other maps representing the other floors of the building were aligned correctly. To check the alignment of the all the maps representing the floors of the building, the positions (e.g. the center positions of the maps) can be checked against each other (that is compared with each other) to detect if one of the maps is an outlier and is thus possibly misaligned.

In another example, the reference information may be based on a radio signal based position estimate. For instance, the reference information may pertain to a position of the map with respect to the reference frame. As an example, the radio signal based position estimate may provide coordinates of a position of an apparatus with respect to the reference frame. This reference information may be used in a check of the alignment of the map. For instance, the reference information may be compared with alignment information, which is obtained based on a position that a user has marked on the aligned map.

For the radio based position estimate a Global Navigation Satellite System (GNSS), a Wireless Local Area Network (WLAN) system and/or a cellular network system (such as a for instance a 2G, 3G, 4G or 5G communication system) may be used. In case of a WLAN system, an offline method (where the apparatus to be positioned does not need Internet access for the positioning) may be used. The apparatus (e.g. a mobile device) may be part of the system, which is used for the radio based position estimate. The radio signal based position estimate may for example be based on a received signal strength (RSS); a timing measurement; an angel of arrival; a magnetic field strength, a magnetic field direction; and/or an identifier of a transmitter of the respective system. In case of a cellular network system, non-limiting examples of an identifier are cellular cell identifiers (e.g. a Mobile Country Code (MCC), a Mobile Network Code (MNC), a Local Area Code (LAC) and/or a Cell Identity (CID) in case of coverage areas of a 2G mobile communications system, a UTRAN Cell ID (UC-ID) in case of a 3G mobile communications system, or an LTE Cell Identity in case of a 4G communications system). In case of a WLAN system, identifiers may be a basic service set identification (BSSID), like the medium access control (MAC) address of observed access points (APs) or the service set identifier (SSID) of the access points.

In another example, the reference information is based on a predefined threshold. A predefined threshold is understood to mean that the value of the threshold may be predefined or that the threshold may be determined in a predefined way. For instance, the predefined threshold is based on a priori information or on plausibility considerations. For instance, if the alignment information result in an alignment of the map that would exceed the predefined threshold, the result of the check may be negative, for instance, in case the scaling of the map is such that a single pixel of the map would represent hundreds of square meters.

According to an exemplary embodiment of the method according to the first aspect, the method further comprises comparing obtained alignment information and the reference information. The check of the alignment of the map can be based on the comparison the alignment information and the reference information. The comparison may thus be performed by the apparatus. This may have the effect that only minimal actions of a user are necessary for the checking of the alignment of the map.

According to an exemplary embodiment of the method according to the first aspect, a positive result of the check of the alignment of the map is assumed when the alignment information and the reference information comply within a predefined tolerance. A predefined tolerance is understood to mean that the value of the tolerance may be predefined or that the tolerance may be determined in a predefined way. For instance, in case the alignment information and the reference information are each representative (e.g. comprise) coordinates, the coordinates may be compared with each other. In case the coordinates are considered to comply with each other within a tolerance, the check may have a positive result and a negative result otherwise. For instance, if the alignment information and the reference information are each representative (e.g. comprise) a length, the check may be positive if the length comply with each other within a tolerance of e.g. 10% and negative otherwise. As another example, if the alignment information and the reference information are each representative (e.g. comprise) a direction, the check may be positive if the directions comply with each other within a certain tolerance of e.g. 30 degrees.

According to an exemplary embodiment of the method according to the first aspect, the method further comprises: displaying the at least a part of the map on a display of the apparatus. The display allows for visually providing the map to the user of the apparatus. As examples, the display may be a light-emitting diode display (LED), an electroluminescent display (ELD), an electronic paper (E-Ink), a plasma display (PDP), a liquid crystal display (LCD), a thin-film transistor display (TFT) and/or an organic light-emitting diode display (OLED). In a preferred embodiment, the display is a touchscreen. In certain embodiments only a part of the map may be displayed on the display (e.g. zoomed in a part of the map) or the complete map may be displayed on the display. The map may for instance be displayed due to a program running on the apparatus and requesting or performing the displaying of the map on the display. Displaying the map may have the effect that in particular the reference information and/or the alignment information may be provided to the user more easily.

According to an exemplary embodiment of the method according to the first aspect, the method further comprises: displaying at least one of the alignment information and the reference information on the displayed map. As an example, if the alignment information pertains to a scaling of the map, the scale of the map may be displayed on the map e.g. in form of a ratio (e.g. "1:100" etc.) or in form of a scale bar.

As another example, if the alignment information pertains to an orientation of the map, the orientation of the map may be displayed on the map e.g. in form an arrow pointing north. As another example, in case the reference information is based on an output of one or more sensors of the apparatus, a position of the user may be tracked based on the sensor measurements and the resulting trajectory may be displayed on the map. In case the reference information is a radio based position estimate, the position estimate may be displayed on the map.

According to an exemplary embodiment of the method according to the first aspect, the method further comprises: asking a user of the apparatus to input at least one of the alignment information and the reference information on the displayed map. The apparatus may in particular comprise input means or an input device for inputting alignment information and/or the reference information or a part thereof. The input means may in particular be a touchscreen providing a convenient way to input the information. As an example, the user may be asked to input alignment and/or reference information, e.g. by marking a position on the map corresponding to his current position. As another example, the user may be asked to input alignment and/or reference information by marking two positions in front of the user on the map thus indicating an orientation or heading of the user. As a further example, in case the map is aligned with regard to the scaling of the map with respect to the reference frame, the user may be asked to input reference information, e.g. by marking a length on the map corresponding to a specific length (e.g. 1 meter). This information may then be compared with the already present scaling of the map due to the alignment of the map.

According to an exemplary embodiment of the method according to the first aspect, the method further comprises: asking a user of the apparatus to check at least one of the alignment information and the reference information displayed on the map. The alignment and/or reference information may be displayed on the map as described above. The user may be able to check the displayed information in comparison to his environment. Returning to above example, where the alignment information pertains to a scaling of the map and the scale of the map is displayed on the map e.g. in form of one or more scale bars, the user may be asked to check the alignment of the map, e.g. by comparing the displayed scale bar(s) with his surrounding and verifying the scale of the map, preferably along both dimensions, which are used to display the map, for instance with regard to latitude and/or longitude.

According to an exemplary embodiment of the method according to the first aspect, the map is, comprises or is comprised of at least one of a digital image; a binary image; and a bitmap.

As an example, the digital image may be a two dimensional digital image. For instance, the map may be a vector or raster image, in particular a bitmapped image. In certain embodiments, the map may have only two possible values for each pixel. For instance, the map may be a binary image, in which each pixel is either black or white or any two other colors. However, the map may also be a map of pixels, where each pixel may store more than two colors, thus using more than one bit per pixel. For instance, the map may be a map of a floor of a building, e.g. a floor plan. For instance, the walls may be represented by one color (e.g. black) and the free spaces may be represented by another or the other color (e.g. white).

The map may also comprise additional information in addition to the digital image, the binary image or the bitmap.

It may however also be possible that the digital image, the binary image or the bitmap comprises additional information in addition to from the map.

According to an exemplary embodiment of the method according to the first aspect, the alignment of the map comprises a transformation of coordinates of the map to coordinates of the reference frame. The coordinate transformation may allow for an alignment pertaining to e.g. scaling, orientation and position of the map with respect to the reference frame. The coordinate transformation may be a two dimensional or three dimensional coordinate transformation, for example. In case of a (partially) unaligned map, the alignment and thus the coordinate transformation may be based on the alignment information, for example.

According to an exemplary embodiment of the method according to the first aspect, the reference frame is or comprises a global coordinate system. Global coordinates may be understood as coordinates of a system that enables every location on the Earth to be specified, e.g by a set of numbers and/or letters. As an example, the coordinates are chosen such that one of the coordinates represents vertical position, and two or three of the coordinates represent horizontal position. A typical choice of coordinates may be latitude, longitude and elevation.

The global coordinates may be part of a geodetic datum or geodetic system, which uses a coordinate system and a set of reference points to locate places on earth. An example is the World Geodetic System (WGS), such as WGS84.

According to an exemplary embodiment of the method according to the first aspect, the map represents at least one of: an indoor area; at least a part of a building; at least a part of a floor; and at least multiple floors.

As an example, the floor may be a floor of a building, such as a public building, a mall, an apartment building, an office building or the like. The map may only cover a part of the floor. There may be a separate map (e.g. bitmap) for each floor. However, it is also possible that the map may cover multiple floors.

According to an exemplary embodiment of the method according to the first aspect, the method further comprises: providing information relating to a result of the checking to a user.

For example, a message confirming the alignment of the map in case of a positive result of the check or warning the user in case of a negative result of the check may be presented to the user of the apparatus, e.g. via output means of the apparatus, e.g. via a display. The user may also receive further information, e.g. information on why the check has a positive or negative result. A warning of a user if the (performed or to be performed) alignment seems to be inaccurate or faulty, may have the effect that a survey data collection with misaligned maps may be prevented. Thus, if issues are found with regard to the alignment, a surveyor and/or operator may be warned, which saves time for the surveyor/operator. As an example, a surveyor may be informed at the very beginning of a surveying about possible alignment issues. Fixing those issues will help him to collect correct data and save time.

According to an exemplary embodiment of the method according to the first aspect, in dependence of a result of the check of the alignment of the map the alignment of the map is at least one of: confirmed; adopted; complemented; corrected; marked; and deleted.

In case of a positive result of the check, the alignment of an already aligned map may be confirmed, in case the map is about to be aligned the alignment may be adopted, that is the map may be aligned e.g. based on the alignment information, which has been checked based on the help of the reference information. If the map is only partially aligned (e.g. only with regard to the scaling with respect to the reference frame), a further type of alignment (e.g. the vertical position of the map with respect to the reference frame) may complement the already present alignment. In case of an already aligned map the alignment of the map may also be corrected, e.g. re-aligned, e.g. based on the alignment information.

In case of a negative result of the check, the alignment of an already aligned map may be marked, e.g. marked as faulty or inaccurate. For example, maps with alignment issues can be marked as low trusted maps. The alignment, e.g. the complete alignment or only a certain type of alignment (e.g. an alignment pertaining to the scale), of the map may be deleted, for instance to prevent further use of the misaligned map. As an example, an operators could get information about the quality of the data, which may help removing faulty or inaccurate "garbage" data easily.

Thus, the method may in particular further comprise confirming, adopting, complementing, correcting, invalidating and/or deleting the alignment of the map with respect to the reference frame.

In a second exemplary aspect, embodiments of the invention provide an apparatus configured to realize or comprising respective means for realizing embodiments of the method according to the first aspect. The apparatus is, for example, a data-processing apparatus, for example a server or a client. The apparatus is for example a mobile device, such as a mobile phone.

In a third exemplary aspect, embodiments of the invention provide an apparatus comprising at least one processor and at least one memory including computer program code, the at least one memory and the computer program code configured to, with the at least one processor, cause an apparatus at least to perform embodiments of the method according to the first aspect. The apparatus is, for example, software-configured in order to be able to carry out the method. Software-configured is intended to be understood to mean, in particular, the preparation of the apparatus which is necessary in order to be able to carry out a method, for example in the form of a program on the processor.

A processor is intended to be understood to mean, inter alia, one or more control units, microprocessors, micro control units such as microcontrollers, digital signal processors (DSP), Application-Specific Integrated Circuits (ASIC) or Field Programmable Gate Arrays (FPGA).

A memory is, for example, a program memory and/or a main memory of the processor. A program memory is intended to be understood to mean, inter alia, a non-volatile memory and a main memory to mean a volatile or non-volatile memory, in particular a random access memory (RAM) and/or a flash memory. Non-volatile memories are for example random access memories (RAM) such as for example NOR flash memories or sequential access memories such as for example NAND flash memories and/or read-only access memories (ROM) such as for example EPROM, EEPROM or ROM memories. The memory may, for example, be of tangible form.

According to an exemplary embodiment of the apparatus according to the second or third aspect, the apparatus comprises a network interface for the connection to a network. A network interface is, for example, a wire-bound network interface, such as an Ethernet network interface or a DSL modem, or a wireless network interface, such as a UMTS network interface or an IEEE 802.11 network interface. The network is, for example, a local area network, a wide area network, a virtual network, a radio network, a telephony network and/or the Internet.

In a fourth exemplary aspect, embodiments of the invention provide computer program code, the computer program code when executed by a processor causing an apparatus to perform the actions of embodiments of the method according to the first aspect. An example of computer program code according to the invention comprises program instructions for carrying out the method according to the first aspect at least partially when the program is executed on a processor. Computer program code is, for example, distributable via a network such as a local area network, a wide area network, a virtual network, a radio network, a telephony network and/or the Internet. Computer program code can at least partially be software and/or firmware of a processor. For example, the computer program code according to fourth aspect is stored in a memory of an apparatus according to the second or third aspect.

In a fifth exemplary aspect, embodiments of the invention provide a (non-transitory) computer readable storage medium in which computer program code according to the fourth aspect is stored. An example of a storage medium according to the fifth aspect comprises the computer program code according to the fourth aspect. The storage medium is, for example, a computer-readable storage medium which contains the program according to the fourth aspect and is designed for example as a magnetic, electrical, electromagnetic, optical and/or other type of storage medium. The storage medium may, in particular, be a physical, a non-transitory and/or tangible storage medium. The storage medium is, for example, portable or permanently installed in an apparatus. The storage medium is, for example, of tangible form. "Computer-readable" is intended to be understood, to mean, in particular, that the storage medium can be read (out) or written by a computer or a data-processing apparatus, for example by a processor. The storage medium is, for example, a program memory of a processor.

The features and example embodiments of the invention described above may equally pertain to the different aspects according to the present invention. In particular, it is understood, that through the description of an additional method step of the method according to the first aspect corresponding means to carry out the method step of the apparatus according to the second or third aspect and a corresponding program instruction of the computer program code according to the fourth aspect are also intended to be regarded as disclosed. The same is intended to apply to the disclosure of a means for carrying out a method step or a program instruction. For example the disclosure of a means to carry out a method step is also intended to be understood as the disclosure of the corresponding method step and a corresponding program instruction.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
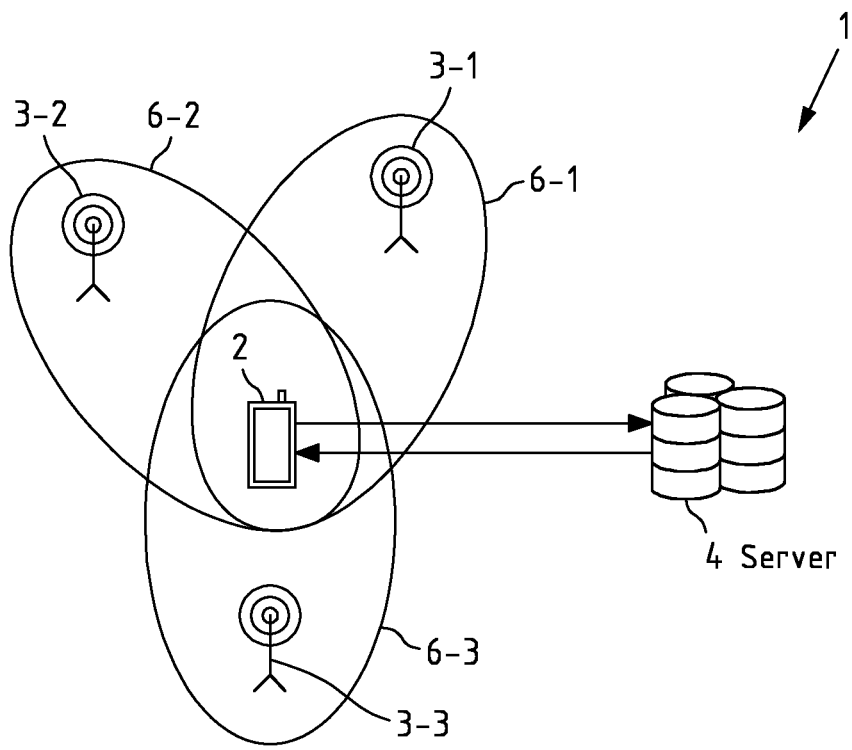
FIG. 1 is a schematic illustration of a survey area in which example embodiments of apparatuses according to the present invention may be deployed.

FIG. 1 shows a surveying area 1, in which example embodiments of apparatuses according to the present invention can be used. In FIG. 1, mobile terminal 2 (which will be further explained with respect to FIG. 2) is capable of checking an alignment of a map (as for example map 10 shown in FIG. 4) in a reference frame. The map may be used for surveying of an area 1 for the training stage. In the training stage, learning data is collected. The data is collected in the form of fingerprints that are based on measurements inter alia by the mobile device 2. The fingerprints contain measurements taken from the radio interface of mobile device 2 and a location estimate of the measurement location.

The mobile device 2 may collect measurements from the transmitters 3-1, 3-2, 3-3, for instance in the form of received signal strengths and identifiers of the transmitters 3-1, 3-2, 3-3. Measurements taken from the radio interface may comprise, by way of example, measured radio signal strengths and an identification of transmitters 3-1, 3-2, 3-3 transmitting the radio signals. Each of transmitters 3-1, 3-2, 3-3 provides radio coverage in a respective coverage area 6-1, 6-2, 6-3. Non-limiting examples of transmitters are cells, nodes or base stations (or sectors thereof) of a cellular communication system, such as for instance a 2G, 3G, 4G or 5G communication system, or a node (e.g. an AP) or a beacon of a non-cellular communication system, such as for instance a WLAN or Bluetooth (BT) network.

The location estimate may be for example manually inputted to the apparatus. For this, a surveyor (e.g. a user of mobile device 2) may input their position estimate on the map (e.g. map 10 of FIG. 4). However, a transformation is generally required from the map coordinates to global coordinates.

Then, in a positioning stage, based on models of the coverage areas and/or radio channel models of the transmitters 3-1, 3-2, 3-3, a mobile terminal is capable of determining its position, for instance as an intersection of coverage areas 6-1, 6-2, 6-3.

However, in case the map is not correctly aligned with respect to the global coordinates as a reference frame, the positioning will be faulty or incorrect.

Thus, mobile terminal 2 or server 4 as example embodiments of apparatuses according to the invention may be able to check an alignment of the map in the reference frame, as will be further explained with respect to FIGS. 5 to 13.

Figure 2:
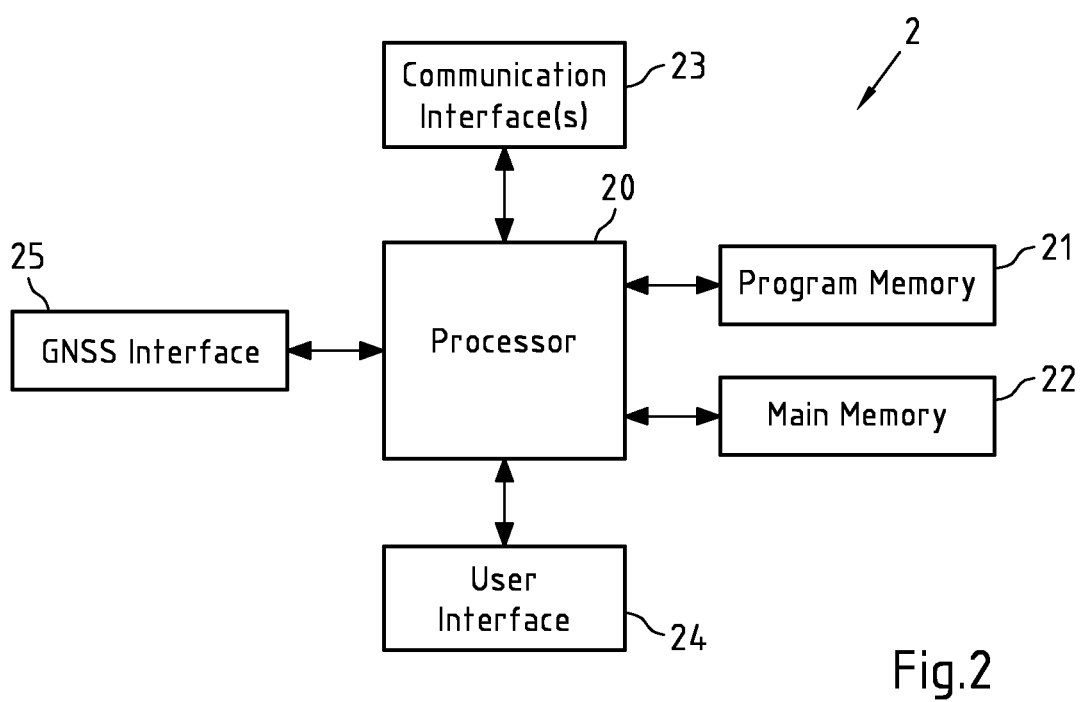
FIG. 2 is a block diagram of the apparatuses 2 of FIG. 1 according to an exemplary embodiment of the invention.

FIG. 2 is a schematic block diagram of an example embodiment of an apparatus 2 according to the invention. Apparatus 2 for instance is or forms a part (e.g. as a module) of a mobile device, e.g. mobile device 2 of FIG. 1. Non-limiting examples of a mobile device are a cellular phone, a personal digital assistant, a laptop computer, a tablet computer or a multimedia player.

Apparatus 2 comprises a processor 20. Processor 20 may represent a single processor or two or more processors, which are for instance at least partially coupled, for instance via a bus. Processor 20 executes a program code stored in program memory 21 (for instance program code causing apparatus 2 to perform one or more of the embodiments of a method according to the invention (as for instance further described below with reference to FIGS. 5 to 13), when executed on processor 20), and interfaces with a main memory 22. Some or all of memories 21 and 22 may also be included into processor 20. One of or both of memories 21 and 22 may be fixedly connected to processor 20 or at least partially removable from processor 20, for instance in the form of a memory card or stick. Program memory 21 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 21 may also comprise an operating system for processor 20. Program memory 21 may for instance comprise a first memory portion that is fixedly installed in apparatus 2, and a second memory portion that is removable from apparatus 2, for instance in the form of a removable SD memory card. One or more sets of position information, for instance in a database, that are useable by apparatus 2 to determine positions may for instance be stored in program memory 21. Main memory 22 may for instance be a volatile memory. It may for instance be a RAM or DRAM memory, to give but a few non-limiting examples. It may for instance be used as a working memory for processor 20 when executing an operating system and/or programs.

Processor 20 further controls a communication interface 23 configured to receive and/or output information. For instance, communication interface 23 may be configured to exchange information with and/or to identify transmitters 3-1, 3-2, 3-3 in area 1 of FIG. 1, and/or to exchange information with server 4 of system 1 (see FIG. 1). Thus, server 4 may as an example also obtain reference information from mobile device 2. As another example, mobile terminal 2 may receive maps from server 2. This communication may for instance be based on a wireless connection. Communication interface 23 may thus for instance comprise circuitry such as modulators, filters, mixers, switches and/or one or more antennas to allow transmission and/or reception of signals. In embodiments of the invention, communication interface 23 is configured to allow communication according to a 2G/3G/4G/5G cellular communication system and/or a non-cellular communication system, such as for instance a WLAN network. Nevertheless, the communication route between mobile terminal 2 and server 4 may equally well at least partially comprise wire-bound portions. For instance, server 4 may be connected to a back-bone of a wireless communication system (associated with mobile terminal 2) via a wire-bound system such as for instance the Internet.

Processor 20 further controls a user interface 24 configured to present information to a user of apparatus 20 and/or to receive information from such a user. Such information may for instance comprise alignment information and/or reference information. User interface 24 may for instance be the standard user interface via which a user of apparatus 2 with apparatus 2 to control other functionality thereof, such as making phone calls, browsing the Internet, etc.

Processor 20 may further control an optional GNSS interface 25 configured to receive positioning information of an GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS). However, indoor environments are generally a challenging environment for GNSS-based technologies, such that different approaches (e.g. crowd sourcing the received signal strength of transmitters 3-1, 32, 3-3) are necessary.

The components 21-25 of apparatus 2 may for instance be connected with processor 20 by means of one or more serial and/or parallel busses.

Figure 3:
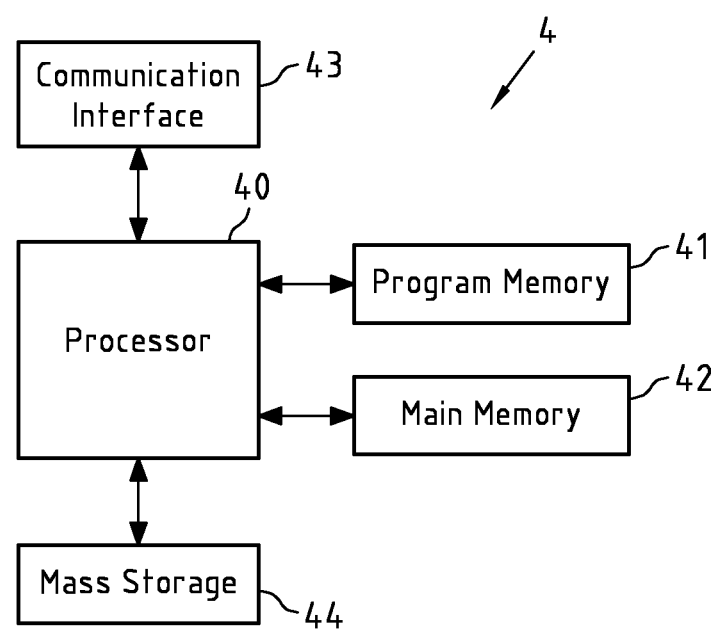
FIG. 3 is a block diagram of the apparatus 4 of FIG. 1 according to a further exemplary embodiment of the invention.

FIG. 3 is a schematic block diagram of an example embodiment of an apparatus 4 according to the invention. Apparatus 4 for instance is or forms a part (e.g. as a module) of a server, e.g. server 4 of FIG. 1.

Apparatus 4 comprises a processor 40. Processor 40 may represent a single processor or two or more processors, which are for instance at least partially coupled, for instance via a bus. Processor 40 executes a program code stored in program memory 41 (for instance program code causing apparatus 4 to perform one or more of the example embodiments of a method according to the invention (as for instance described below with reference to FIGS. 5 to 13), when executed on processor 40). Processor 40 further interfaces with a main memory 42 (for instance acting as a working memory) and a mass storage 44.

Memories 41 and/or 42 may also be included into processor 40. Memories 41 and/or 42 may be fixedly connected to processor 40 or may at least partially be removable from processor 40, for instance in the form of a memory card or stick. Program memory 41 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 41 may also comprise an operating system for processor 40. Program memory 40 may for instance be implemented as a hard disk. Main memory 42 may for instance be a volatile memory. It may for instance be a RAM or DRAM memory, to give but a few non-limiting examples. It may for instance be used as a working memory for processor 40 when executing an operating system and/or programs. Mass storage 44 may for instance be embodied as mass storage device, for instance with capacities of several Gigabytes or several Terabytes. It may either be fixedly connected to processor 40, or may be releasably connectable thereto. Non-limiting examples of mass storage 44 are a direct-attached storage (DAS), a storage area network (SAN) or a Network-attached storage (NAS).

Processor 40 further controls a communication interface 43 configured to receive and/or output information. For instance, communication interface 43 may be configured to exchange information with mobile device 2 (see FIG. 1). This may for instance comprise receiving data (e.g. reference information) from mobile device 2 and/or providing data (e.g. maps) to mobile terminal 2. As already explained, this communication may for instance be based on a wireless connection. Communication interface 43 may thus for instance comprise circuitry such as modulators, filters, mixers, switches and/or one or more antennas to allow transmission and/or reception of signals. In embodiments of the invention, communication interface 43 is configured to allow communication according to a 2G/3G/4G/5G cellular communication system and/or non-cellular communication system. Equally well, communication interface 43 may be a wire-bound system interface. It may for instance allow apparatus 4 to communicate with a network such as the internet. The communication route from the server 4 to mobile device 2 may then for instance comprise both wire-bound and wireless portions. The wire-bound portion may for instance connect communication interface 43 with a backbone of a wireless communication system, and the wireless portion may connect the wireless communication system with mobile device 2.

The components 41-44 of apparatus 4 may for instance be connected with processor 40 by means of one or more serial and/or parallel busses.

It is to be noted that the circuitry formed by the components of apparatuses 2 and 4 may be implemented in hardware alone, partially in hardware and in software, or in software only, as further described at the end of this specification.

Figure 4:
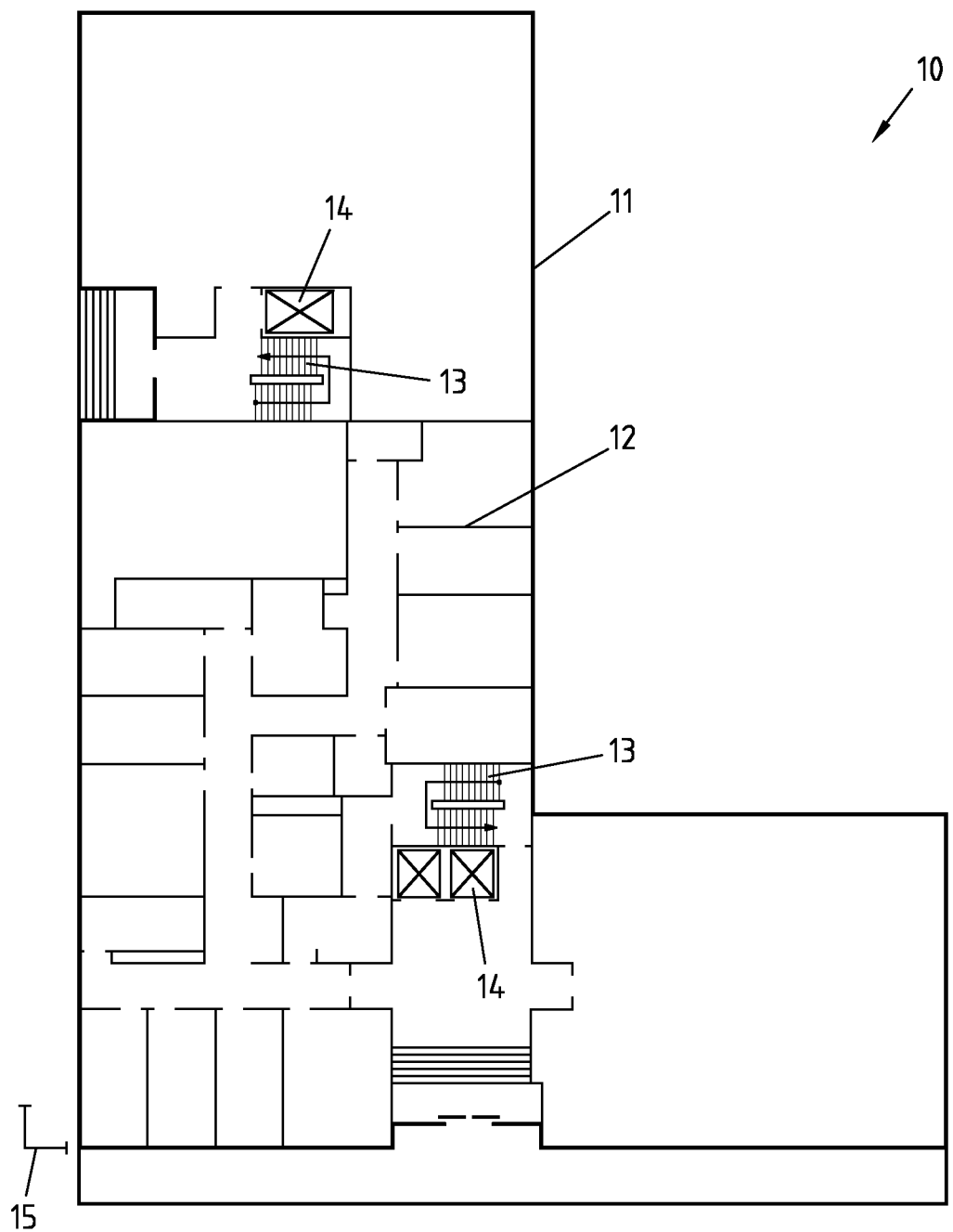
FIG. 4 is an illustration of a bitmap representing a floor plan of a building, which may be used as a basis for surveying the corresponding floor of the building.

Program memories 21 of FIG. 2 and 41 of FIG. 4 may be considered as tangible storage media, which may in particular be non-transitory storage media. They may comprise respective programs, which in turn comprise respective program code (for instance a set of instructions). Examples of such tangible storage media will be presented with respect to FIG. 14 below.

FIG. 4 is an illustration of a floor plan of a building, which may be used as a map 10 (e.g. in form of a bitmap) for surveying the corresponding floor of the building, e.g. area 1 of FIG. 1, with a mobile device, e.g. mobile device 2. The building may be an office building or a public building, such as a mall, for instance. The map is saved as a two-dimensional digital bitmap image or binary image. Thus, the map has only two possible values for each pixel. Each pixel is either black or white. Walls and further details are represented by the color black, while free spaces are represented by the color white. The map 10 shows details of the floor such as outer walls 11, inner walls 12 stairs 13 and elevators 14, for example. Depending on the situation, the map may already be (partially) aligned with respect to global coordinates or (partially) unaligned with respect to global coordinates.

The map may for instance be shown to the user of the mobile device 2, e.g. on a display of the mobile device 2.

FIGS. 5 to 13 now show different exemplary embodiments of methods for checking the alignment of a map. The methods may be performed by an apparatus, such as mobile device 2 or server 4.

Figure 5:
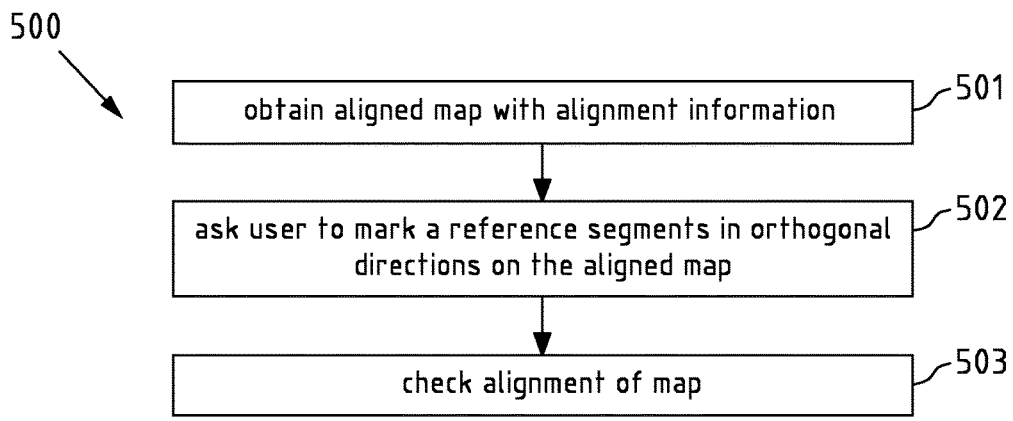
FIG. 5 is a flow chart illustrating a method according to an exemplary embodiment of the invention.

FIG. 5 is a flow chart 500 illustrating a method according to an exemplary embodiment of the invention. The exemplary embodiment of FIG. 5 may be used for checking the scaling of an aligned map.

An aligned map, e.g. map 10 of FIG. 4, with respective alignment information is first obtained, e.g. by loading a bitmap from a memory, e.g. one of memories 20, 21 of mobile device 2 or one of memories 41, 42, 44 of server 4 (action 501). Alignment information may be embedded in the bitmap or obtained separately, for example. Thus, alignment information pertaining to the scaling of the map (e.g. information on how many pixels equal one meter in each direction) may be obtained by the apparatus with the map for instance. The map 10 may be output on a display of the respective device, e.g. a display of the apparatus.

Then, the user is asked to mark one or more reference segments (e.g. segments with a predefined length, e.g. one meter) on the aligned map, e.g. by inputting user given coordinates. Preferably, the user is asked to mark two reference segments (e.g. two one-meter-segments) orthogonally to each other on the aligned map. Thus, the apparatus receives reference information allowing for a check of the alignment pertaining to the scaling of the map with respect to global coordinates (action 502).

After having obtained the alignment information and the reference information, the apparatus (or a part thereof) may perform a check of the alignment of the map pertaining to the scaling of the map based on the obtained alignment information and the obtained reference information (action 503). Now, if the input coordinates each produce a one-meter-segment (in both of the orthogonal directions) within a certain threshold, then the alignment has been done correctly. In other words, if the distances or the scaling resulting from the alignment information and the reference information input by the user comply with each other, e.g. the difference between the respective distances is within a predefined tolerance value, e.g. less than 10% of the total reference length (1 meter), the scale of the aligned map can be verified. As already described, the checking of scale should be done in two orthogonal directions for validating the scale of both the axis in which the bitmap has been drawn.

Figure 6:
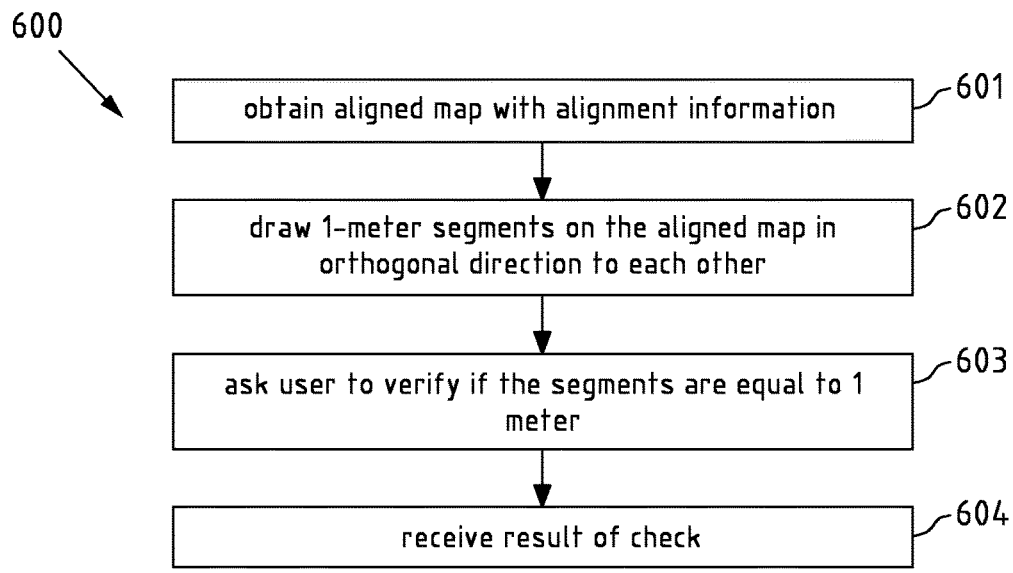
FIG. 6 is a flow chart illustrating a method according to a further exemplary embodiment of the invention.

FIG. 6 is a flow chart 600 illustrating a method according to a further exemplary embodiment of the invention. The exemplary embodiment of FIG. 6 may also be used for checking the scaling of an aligned map.

After having obtained an aligned map, e.g. map 10 of FIG. 4, with respective alignment information (action 601), the map is provided to the user. As shown in FIG. 4, two reference one-meter-segments 15 are drawn on the aligned map in orthogonal direction to each other based on the alignment information (action 602). The user is asked to verify, if the segments are equal to one meter (action 603). A user could verify the scaling by comparing the dimensions in the aligned map to reference information, e.g. a known reference dimension in his environment to validate the drawn one meter line (e.g. width of the door close to the user etc.). The user may then confirm (e.g. via input means of the apparatus) that the scaling is correct. Thus, the apparatus receives a result of the check (action 604).

Figure 7:
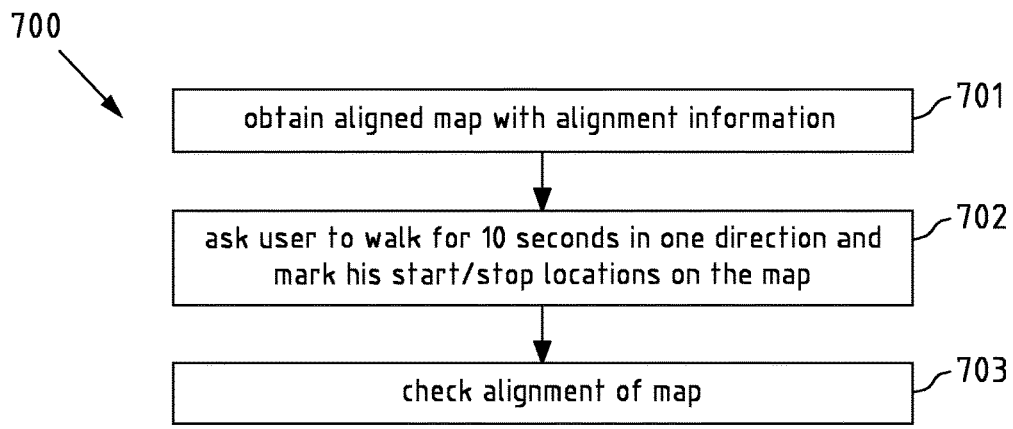
FIG. 7 is a flow chart illustrating a method according to a further exemplary embodiment of the invention.

FIG. 7 is a flow chart 700 illustrating a method according to a further exemplary embodiment of the invention. The exemplary embodiment of FIG. 7 may also be used for checking the scaling of an aligned map.

After having obtained an aligned map, e.g. map 10 of FIG. 4, with respective alignment information (action 701), the map can be provided to the user. The user is asked to walk for certain amount of time (e.g. 10 seconds) in one direction and mark his start/stop locations on the map (action 702). The human motion model can be used for checking if the walking speed is representing sensible speed (e.g. 0.5 meters/second to 5 meters/second) for a human. Thus, the apparatus obtains reference information allowing for a check of the alignment. As before, these actions should be performed for both orthogonal directions of the map in order to check the alignment in the direction of both of the orthogonal axes of the map.

Figure 8:
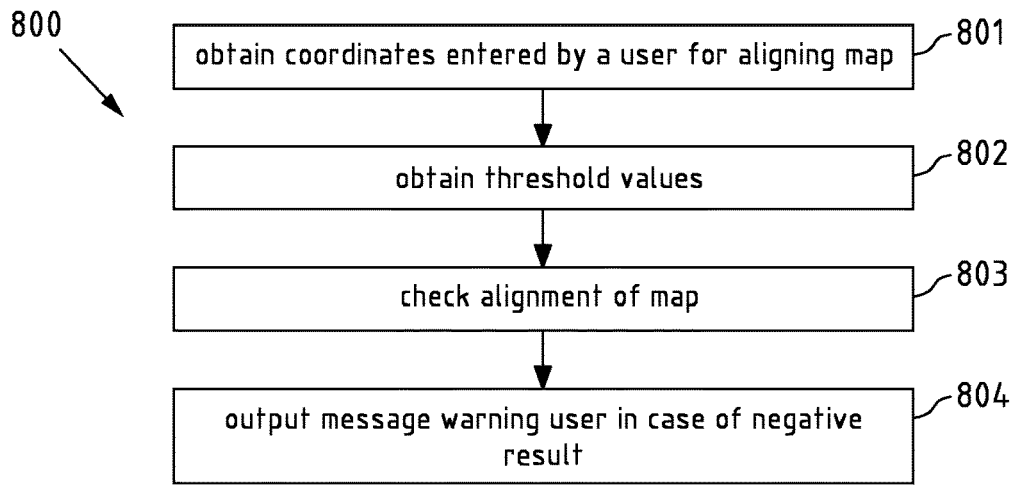
FIG. 8 is a flow chart illustrating a method according to a further exemplary embodiment of the invention.

FIG. 8 is a flow chart 800 illustrating a method according to a further exemplary embodiment of the invention. The exemplary embodiment of FIG. 8 may be used for checking the scaling of a map.

In this example a map is obtained, which is not yet aligned, for example. The user enters coordinates, which are suitable for aligning the map. Thus, the apparatus obtains alignment information, which can be used for aligning the map (action 801). The apparatus then obtains reference information based on a threshold, e.g. the resulting scaling of the map may need to be in a certain expected interval (action 802). This reference information may be predefined and the apparatus may only need to obtain the information from the memory, for instance. As an example, if the entered coordinates produce dimension of the map that cannot be drawn on the device properly, e.g. if a single pixel of the bitmap represents hundreds of square meter on maximum zoom level of the device, the check of the alignment of the map may have a negative result and the alignment may be considered faulty or inaccurate (action 803). The user may then be warned about the possibly wrong alignment by an output message (action 804).

Figure 9:
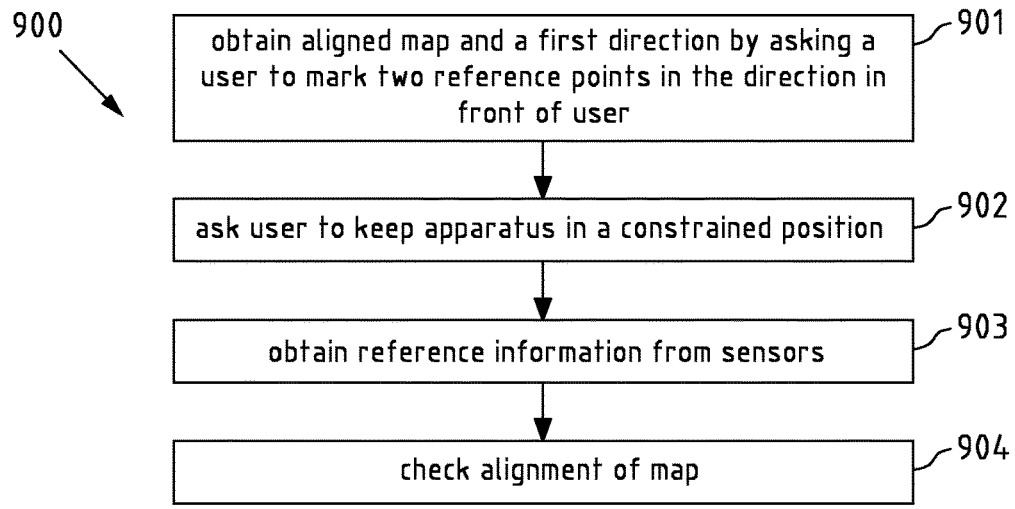
FIG. 9 is a flow chart illustrating a method according to a further exemplary embodiment of the invention.

FIG. 9 is a flow chart 900 illustrating a method according to a further exemplary embodiment of the invention. The exemplary embodiment of FIG. 9 may be used for checking the orientation of an aligned map.

A first direction or heading on a map is obtained by asking a user to mark two reference points in the direction in front of user. As an example, the marked locations can be transformed to local coordinates at the position of the apparatus, e.g. East North Up (ENU) coordinates, and the heading from North can be computed using the arctangent function, i.e. a tan 2(delta north/delta east). Thus, the apparatus may obtain alignment information which are based on the alignment of the map and the user input (action 901).

The user is then asked to keep the device in a constrained position e.g. the apparatus facing towards the sky and heading in the direction in front of the user to comply with the first direction (action 902). From the magnetometer of the apparatus a second direction as reference information is obtained (action 903). For a check of the alignment of the map, the alignment information and the reference information (i.e. the two directions) can be compared to validate the alignment with regard to the orientation of the map (action 904). The result of the check can provide an indication if the map alignment has issues. As an example, this may be assumed, if directions differ from each other more than a predefined tolerance value (e.g. 30 degrees). In other words, a check of the orientation of the map can be done by comparing a direction obtained from sensors (in this case the magnetometer) of the apparatus with the direction calculated from the aligned map (in this case by using two reference points of the aligned map). If the two directions comply with each other, then the orientation can be validated.

In order to use this approach the user may have to calibrate the magnetometer and stand away from the ferromagnetic material. Additionally, if the user is in some moving platform, the movement of the platform should be considered for a proper calibration of the magnetometer and/or alignment of the map, e.g. an alignment of the map while traveling in trains/ships should be only done when the platform is not changing its direction.

Figure 10:
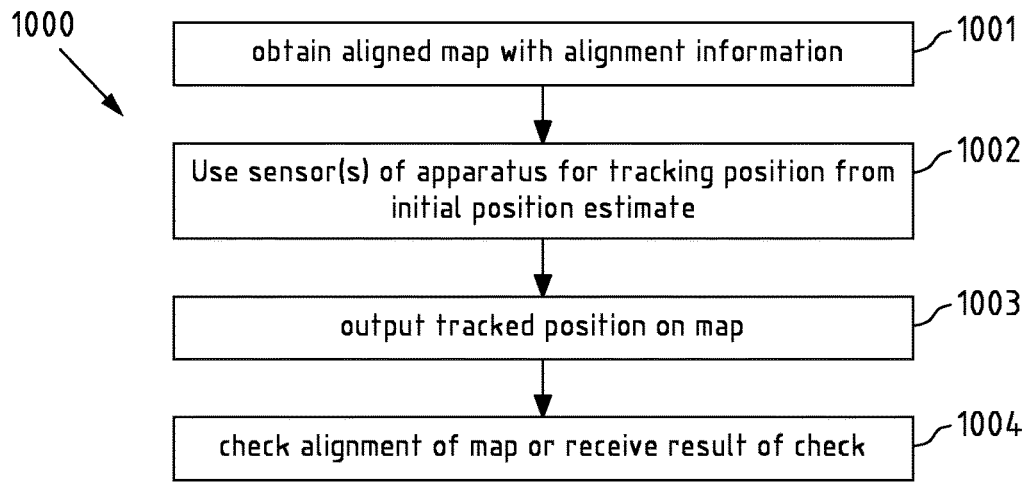
FIG. 10 is a flow chart illustrating a method according to a further exemplary embodiment of the invention.

FIG. 10 is a flow chart 1000 illustrating a method according to a further exemplary embodiment of the invention. The exemplary embodiment of FIG. 10 may be used for checking different types of alignment of an aligned map.

First, an aligned map with alignment information is obtained (action 1001). The apparatus may obtain an initial position estimate of the apparatus, e.g. from a manual input or a radio signal based position estimate. Available sensors of the apparatus suitable for determining the motion of the apparatus (such as an accelerometer, a gyroscope, a magnetometer, or a barometer) may then be used to propagate the initial position estimate based on the motion detected by the sensor(s), so that the apparatus obtains reference information (action 1002). This may for instance result in a trajectory of the movement of the apparatus and the user, respectively. The tracked position may be output on the map (action 1003). As an example, the scaling of aligned map can then be checked by comparing the trajectory resulting from the sensors with the output shown in the aligned map. As an example, if the results produce by sensors is overshooting or very small in comparison to the actual travel distance on the map, a faulty or inaccurate alignment may be determined. This check may be done by the apparatus. Alternatively, this check may also be performed by the user and the apparatus may receive the result of the check of the alignment of the map (action 1004).

This approach may also be used for checking the alignment with regard to an orientation of the aligned map, e.g. if a rotation detected by the sensor(s) is plotted differently on the map.

Figure 11:
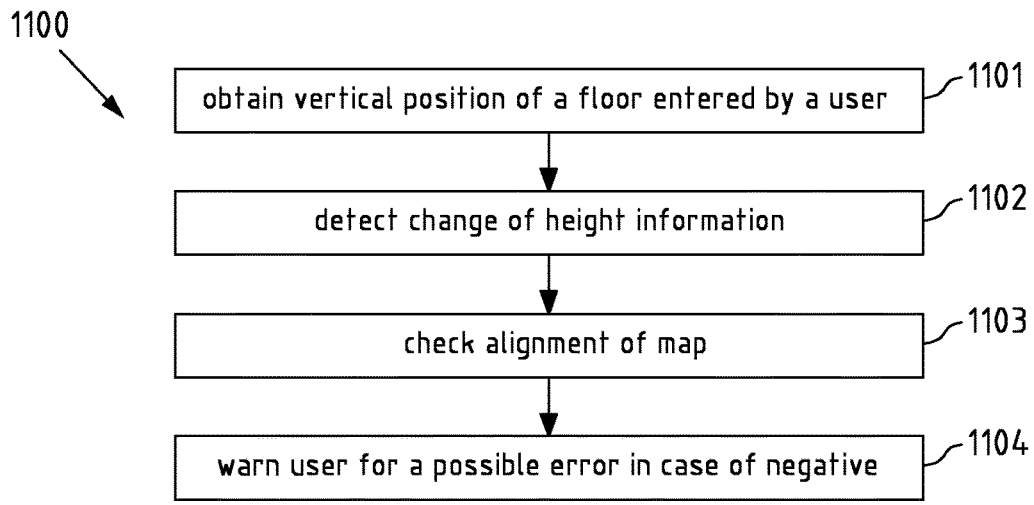
FIG. 11 is a flow chart illustrating a method according to a further exemplary embodiment of the invention.

FIG. 11 is a flow chart 1100 illustrating a method according to a further exemplary embodiment of the invention. The exemplary embodiment of FIG. 11 may be used for checking the alignment with regard to a vertical position of a map.

In this example, the user inputs the vertical position of the floor (e.g. the altitude, the floor index etc.), which input is obtained by the apparatus (action 1101). Thus, the apparatus obtains alignment information, which can be used for an alignment of the map pertaining to the vertical position with respect to the reference frame. The apparatus may keep record of barometer readings and thus the pressure of the environment. From these pressure measurements information regarding a change of height can be determined. Thus the apparatus obtains reference information pertaining to the vertical position of the map (action 1102). The apparatus may then check, if the height change determined based on the barometer measurements complies with the vertical position entered by the user (action 1103). In case of a negative result, the user may be warned about a possible error when entering the vertical position (e.g. the floor index) (action 1104).

In particular for this approach, it may be advantageous to consider the time of measurement of the ambient pressure. The ambient pressure can generally be considered stable within a small enough period of time, e.g. 10 minutes. Thus, as an example, the pressure measurements may only be used for the reference information in case the pressure measurement is not older than a predefined period of time, e.g. 10 minutes.

Figure 12:
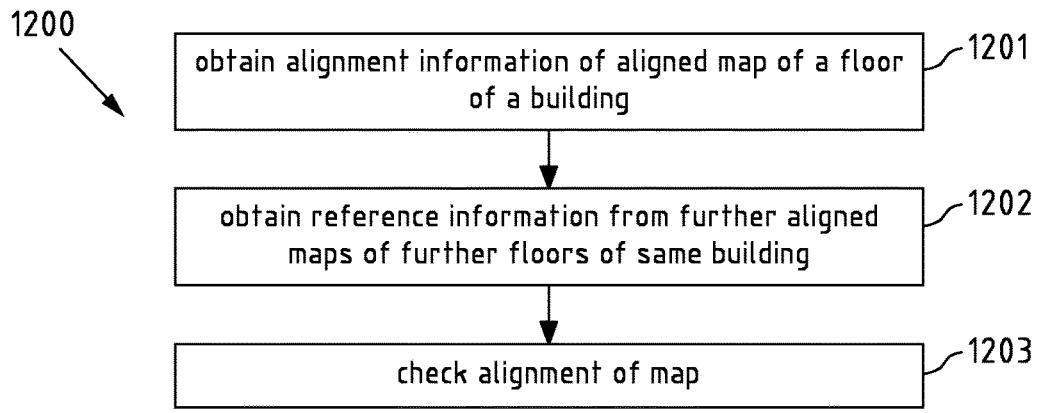
FIG. 12 is a flow chart illustrating a method according to a further exemplary embodiment of the invention.

FIG. 12 is a flow chart 1200 illustrating a method according to a further exemplary embodiment of the invention. The exemplary embodiment of FIG. 12 may be used for checking the alignment with regard to a (horizontal) position of a map.

First, an aligned map of a floor of a building is obtained (action 1201). From the aligned map a center of the floor with respect to the reference frame can be determined as alignment information.

In case further aligned maps of further floors of the same building are available, reference information can be obtained by determining the respective centers of the further floors of the further aligned maps with respect to the reference frame (action 1202). The centers of the maps of the different floors can then be compared (action 1203). If the center of the floor is located in a reasonable distance to the centers of the further floors, then the check of the alignment of the map may be positive. If the center of the floor is however positioned far away (e.g. above a predefined threshold) from the centers of the further floors, then a misalignment of one or more floors can be detected. This may also be repeated for different floors. In other words, if the centers of all the floors are located in some reasonable distance with respect to each other, then the maps may be aligned correctly and if the center of one or more floors is located very far away from the center of the further floors then a misalignment of one or more floors can be detected.

Figure 13:
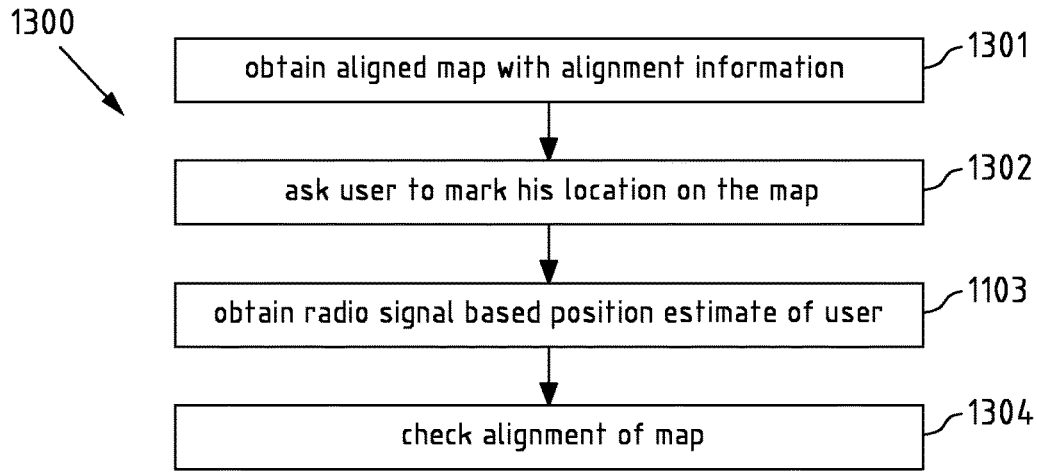
FIG. 13 is a flow chart illustrating a method according to a further exemplary embodiment of the invention.

FIG. 13 is a flow chart 1300 illustrating a method according to a further exemplary embodiment of the invention. The exemplary embodiment of FIG. 13 may be used for checking the position of an aligned map.

In this embodiment, after obtaining an aligned map (action 1301), the user is asked to mark his location on the map (1302). Thus, the apparatus may obtain alignment information. Further, a radio signal based position estimate (e.g. based on cell positioning, outdoor Wi-Fi positioning, GNSS positioning etc.) is obtained as reference information (action 1303). The alignment may be checked by checking the distance between the estimated position and the position marked by the user (action 1304). If the different is above a predefined threshold, e.g. several kilometers, an alignment issues may be assumed. This approach allows already available positioning solutions to help in the indication of a misalignment. The (legacy) coarse positioning solution can give some idea of the user location and can thus prevent very large errors done during the alignment.

Figure 14:
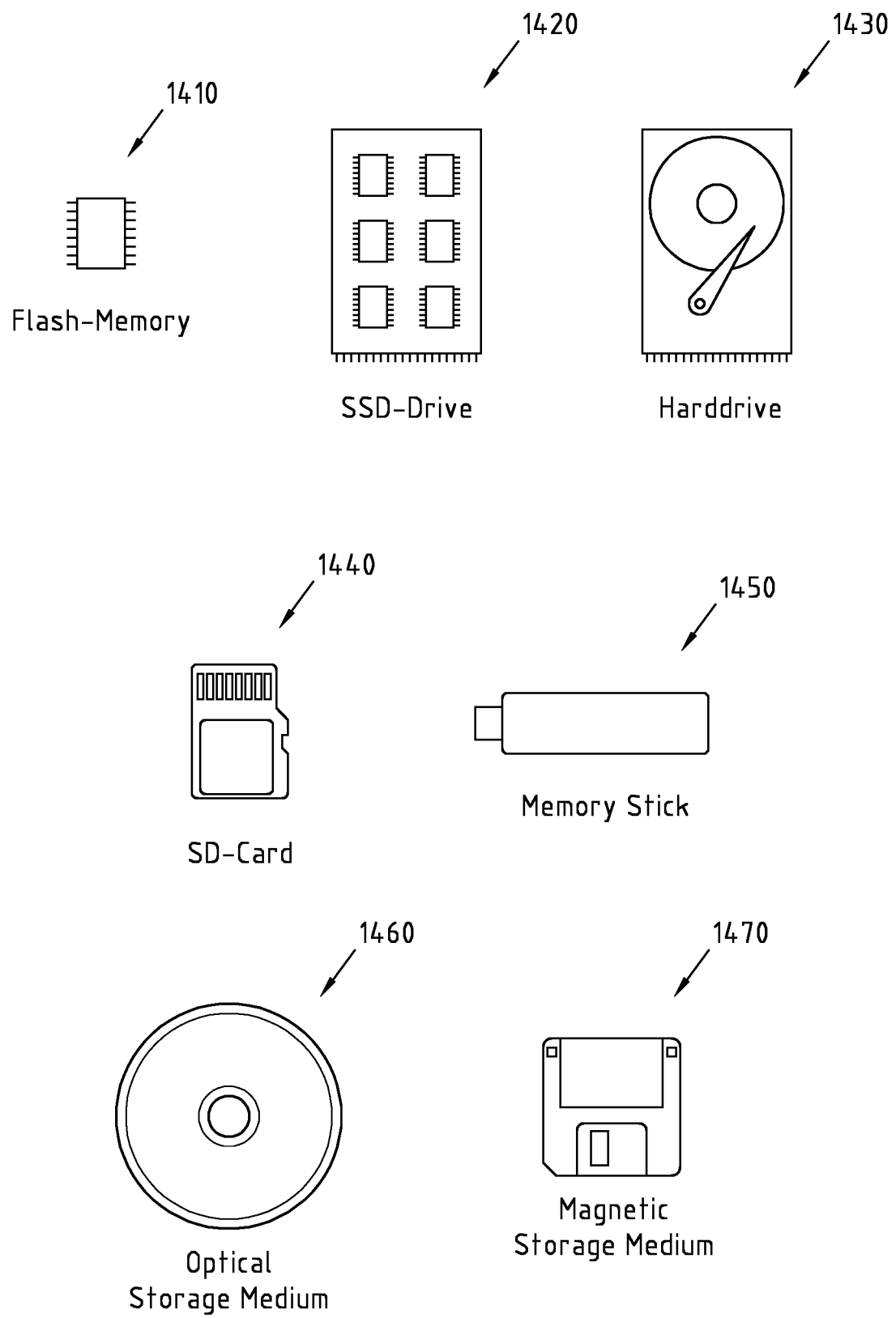
FIG. 14 a schematic illustration of examples of tangible storage media according to the present invention.

FIG. 14 illustrates examples of tangible storage media that may for instance be used to implement program memory 21 of FIG. 2 and/or program memory 41 of FIG. 3. To this end, FIG. 14 displays a flash memory 1410, which may for instance be soldered or bonded to a printed circuit board, a solid-state drive 1420 comprising a plurality of memory chips (e.g. Flash memory chips), a magnetic hard drive 1430, a Secure Digital (SD) card 1440, a Universal Serial Bus (USB) memory stick 1450, an optical storage medium 1460 (such as for instance a CD-ROM or DVD) and a magnetic storage medium 1470.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 20 and 40 of FIGS. 2 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. An apparatus comprising at least one processor and at least one memory including computer program code, the at least one memory and the computer program code configured to, with the at least one processor, cause the apparatus at least to:
   obtain alignment information pertaining to a map, which is or is to be aligned in a reference frame;
   provide an instruction to a user to walk in a predefined direction for a predefined amount of time and to mark start and stop locations on the map;
   obtain reference information comprising motion data indicating motion of the apparatus or the user in accordance with the provided instruction; and
   perform a check of alignment of the map in the reference frame or receive a result of a check of the alignment of the map in the reference frame, wherein the check of alignment of the map is at least based on the obtained alignment information and on the obtained reference information including the motion data indicating the motion of the apparatus or the user in accordance with the provided instruction.

2. The apparatus according to claim 1, wherein the check of the alignment of the map at least pertains to at least one of:
   a scaling of the map with respect to the reference frame;
   an orientation of the map with respect to the reference frame; and
   a position of the map with respect to the reference frame.

3. The apparatus according to claim 1, wherein at least one of the alignment information and the reference information pertains to at least one of:
   a scaling of the map with respect to the reference frame;
   an orientation of the map with respect to the reference frame; and
   a position of the map with respect to the reference frame.

4. The apparatus according to claim 1, wherein the map is at least one of at least partially aligned and at least partially unaligned with respect to the reference frame.

5. The apparatus according to claim 1, wherein at least one of the alignment information and the reference information is representative of at least one of:
   at least one length;
   at least one direction;
   at least one position; and
   at least one vertical position.

6. The apparatus according to claim 1, wherein the alignment information is based on at least one of:
   a user input; and
   the alignment of the map.

7. The apparatus according to claim 1, wherein the reference information is based on at least one of:
   a user input;
   an output of one or more sensors of a mobile device;
   the alignment of at least one map;
   a radio signal based position estimate; and
   a predefined threshold.

8. The apparatus according to claim 1, wherein the at least one memory and the computer program are further configured to, with the at least one processor, cause the apparatus to:
   compare the alignment information and the reference information.

9. The apparatus according to claim 1, wherein a positive result of the check of the alignment of the map is assumed when the alignment information and the reference information comply within a predefined tolerance.

10. The apparatus according to claim 1, wherein the at least one memory and the computer program are further configured to, with the at least one processor, cause the apparatus to:
    display at least a part of the map on a display of the apparatus.

11. The apparatus according to claim 10, wherein the at least one memory and the computer program are further configured to, with the at least one processor, cause the apparatus to:
    display at least one of the alignment information and the reference information on the displayed map.

12. The apparatus according to claim 10, wherein the at least one memory and the computer program are further configured to, with the at least one processor, cause the apparatus to:
    provide a request user input from a user of the apparatus to input at least one of the alignment information and the reference information on a displayed map, and/or provide a request for user input from a user of the apparatus to check at least one of the alignment information and the reference information displayed on the map.

13. The apparatus according to claim 1, wherein the map is, comprises or is comprised of at least one of:
   a digital image;
   a binary image; and
   a bitmap.

14. The apparatus according to claim 1, wherein the alignment of the map comprises a transformation of coordinates of the map to coordinates of the reference frame, and/or
   wherein the reference frame is or comprises a global coordinate system.

15. The apparatus according to claim 1, wherein the map represents at least one of:
   an indoor area;
   at least a part of a building;
   at least a part of a floor; and
   at least multiple floors.

16. The apparatus according to claim 1, wherein the at least one memory and the computer program are further configured to, with the at least one processor, cause the apparatus to:
   provide information relating to a result of the check to a user.

17. The apparatus according to claim 1, wherein in dependence of a result of the check of the alignment of the map the alignment of the map is at least one of:
   confirmed;
   adopted;
   complemented;
   corrected;
   marked; and
   deleted.

18. A non-transitory computer readable medium in which computer program code is stored, the computer program code when executed by a processor causing an apparatus to:
   obtain alignment information pertaining to a map, which is or is to be aligned in a reference frame;
   provide an instruction to a user to walk in a predefined direction for a predefined amount of time and to mark start and stop locations on the map;
   obtain reference information comprising motion data indicating motion of the apparatus or the user in accordance with the provided instruction; and
   perform a check of alignment of the map in a reference frame or receive a result of a check of the alignment of the map in the reference frame, wherein the check of alignment of the map is at least based on the obtained alignment information and on the obtained reference information including the motion data indicating the motion of the apparatus or the user in accordance with the provided instruction.

19. A method, performed by an apparatus, the method comprising:
   obtaining alignment information pertaining to a map, which is or is to be aligned in a reference frame;
   providing an instruction to a user to walk in a predefined direction for a predefined amount of time and to mark start and stop locations on the map;
   obtaining reference information comprising motion data indicating motion of the apparatus or the user in accordance with the provided instruction; and
   performing a check of alignment of the map in a reference frame or receiving a result of a check of the alignment of the map in the reference frame, wherein the check of alignment of the map is at least based on the obtained alignment information and on the obtained reference information including the motion data indicating the motion of the apparatus or the user in accordance with the provided instruction.

20. The apparatus of claim 1, wherein the at least one memory and the computer program are further configured to, with the at least one processor, cause the apparatus to:
   provide a request for user input of a user location on the map;
   obtain a radio signal position estimate of the user; and
   perform an alignment check through comparing the user input of the user location on the map and the radio signal position estimate.

21. The apparatus of claim 1, wherein the apparatus is further caused to:
   obtain an initial position estimate;
   generate a trajectory of the user within an environment represented by the map based on a detected motion; and
   provide an indication of the trajectory to the user for confirmation of alignment of the map.

* * * * *